A. MOFFITT.
Wagon.
No. 111,665. Patented Feb. 7, 1871.
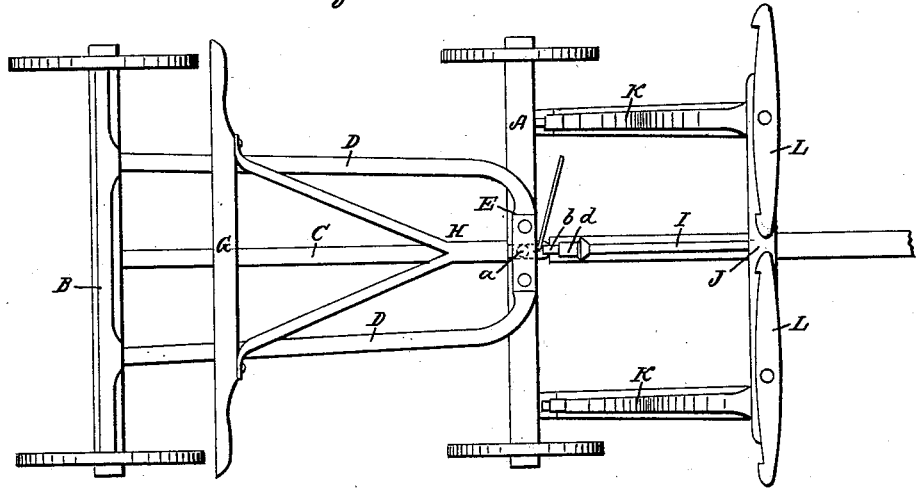
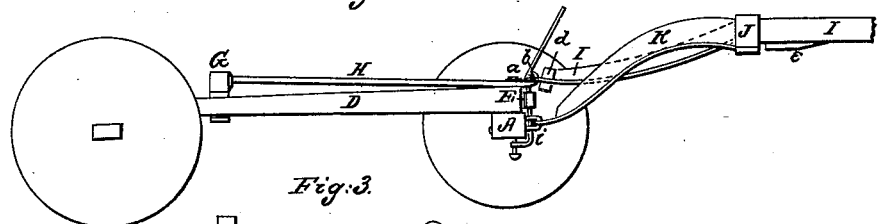
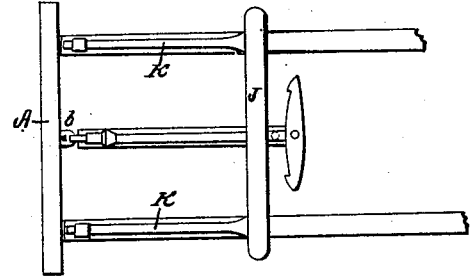
Witnesses:
J. E. Hutchinson.
C. L. Everit.
Inventor:
Alexander Moffitt.
per Alexander Mason,
attys.

United States Patent Office.

ALEXANDER MOFFITT, OF WASHINGTON, DISTRICT OF COLUMBIA.

Letters Patent No. 111,665, dated February 7, 1871.

IMPROVEMENT IN WAGONS.

The Schedule referred to in these Letters Patent and making part of the same.

*To all whom it may concern:*

Be it known that I, ALEXANDER MOFFITT, of Washington, in the District of Columbia, have invented certain new and useful Improvements in Running-gear of Wagons and other Vehicles; and do hereby declare that the following is a full, clear, and exact description thereof, reference being had to the accompanying drawing and to the letters of reference marked thereon making a part of this specification.

The nature of my invention consists in the construction and arrangement of the running-gear of a wagon or other vehicle, as will be hereinafter fully set forth.

In order to enable others skilled in the art to which my invention appertains to make and use the same, I will now proceed to describe its construction and operation, referring to the annexed drawing, in which—

Figure 1 is a plan view, and
Figure 2 is a side view.
Figure 3 is a plan view, showing how shafts may be attached.

A represents the front axle, and
B the rear axle of a wagon or other vehicle, connected together by means of a center perch, C, and two side perches, D D.

The side perches D D are made of one piece, bent in the center, so as to form the head-block E, which rests upon the front axle A, while the ends of this piece of stuff form the two side perches, the rear ends of which are securely fastened, in any suitable manner, to the rear axle B.

The center perch C is also secured to the rear axle B, and its front end inserted in a mortise and secured to the head-block E.

In some cases I may dispense with the center perch.

G represents the brake-bar, to the front side of which is secured a forked stay, H; or, I may use one continuous bent stay, or two stays connected to one piece, which passes through a mortise in the head-block E, the king-bolt $a$ then passing through the head-block, an elongated slot in the stay, and the front axle.

The brake-bar G may rest upon the perches, and be guided by loops surrounding the same; or it may be suspended from the wagon-box in such a manner that it may be moved back and forth.

On the front end of the brake-bar stay H is formed a hook, $b$, which is passed through an eye or slot in the rear end of the pole or tongue I, a rubber block, $d$, being inserted in slot or eye to prevent rattling or the tongue from coming loose.

The tongue I passes through a mortise in the center of a whiffletree-bar, J, which is connected with the axle A by means of two curved bars or footstalls, K K, one at or near each end, as shown in fig. 1.

The whiffletrees L L are pivoted on the bar J.

The footstalls K K are attached to the front axle A by means of eyes or loops at their rear ends passing over hooks screwed to the axle, thus forming three connections between the team and the front axle.

On the under side of the tongue, immediately in front of the whiffletree-bar J, is placed a stop, $e$, which, bearing against the whiffletree-bar, prevents the tongue or pole from sagging down, but holds it up, and thus removes the weight of the same from the horses' necks. The stop $e$ may be moved backward or forward, so as to accommodate the height of the pole to the size of the horses or mules used.

It will be noticed that on level ground the brake cannot be applied; or, in other words, the brake cannot be operated by pushing the pole straight back; but by raising the pole the brake is instantly applied. In going down hill, for instance, the wagon will rush forward on the team, which naturally raises the pole and instantaneously applies the brakes.

When it is desired not to apply the brakes a latch, $i$, may be inserted in the slot on the brake-bar stay H, so as to prevent the same from being moved inward.

Shafts may be attached in the following manner: Remove the pole I and insert a short pole through the whiffletree-bar J, the rear end of said short pole being hooked onto the hook $b$, and the whiffletree is attached to its front end, in front of the bar J. The shafts are then firmly secured to the bar J, so as to form a stiff continuation of the footstalls K K. Or the shafts may be hooked to the axle in place of the footstalls K K, in which case the shafts should be connected by a cross-bar to take the place of the bar J, and then the short pole passed through said cross-bar and fastened on the hook $b$.

The pole or shafts may be used without a brake by attaching a short plate to the center perch, said plate or bar to pass through the head-block and be provided with a hook, the same as the front end of the brake-bar stay H.

Having thus fully described my invention,
What I claim as new, and desire to secure by Letters Patent, is—

1. The combination of a pole or shaft attachment with a brake, when so arranged that the brake will be applied only by the raising of the pole or shafts, substantially as herein set forth.

2. The pole I, passing through a mortise in the whiffletree-bar J, or a loop attached to said bar, and attached to the hook $b$, substantially as and for the purposes herein set forth.

3. In combination with the pole I and whiffletree-bar J, the adjustable stop $e$, substantially as and for the purposes herein set forth.

4. The combination of the pole I, whiffletree-bar J stop e, and supports or footstalls K K, constructed and arranged substantially as and for the purposes herein set forth.

5. The brake-bar stay H, passing through the head-block E, and provided with a hook, b, on its front end for attaching the pole, substantially as and for the purposes herein set forth.

6. In combination with the brake-bar stay H, a latch for locking the same, so that the brakes will not operate, substantially as set forth.

In testimony that I claim the foregoing I have hereunto set my hand this 21st day of November, 1870.

ALEX. MOFFITT.

Witnesses:
C. L. EVERT,
A. N. MARR.